United States Patent Office 3,458,343
Patented July 29, 1969

3,458,343
SHEET MATERIAL AND A METHOD FOR THE MANUFACTURE OF SHEET MATERIAL
John V. Bennett, Redditch, John L. Smith, Coleshill, and Peter W. Berry, Blaby, near Leicester, England, assignors to The Dunlop Company Limited, London, England, a British company
No Drawing. Filed June 28, 1966, Ser. No. 561,013
Claims priority, application Great Britain, July 20, 1965, 30,730/65
Int. Cl. B44d 1/44
U.S. Cl. 117—65.2      23 Claims

ABSTRACT OF THE DISCLOSURE

Fibrous material impregnated with a blend of a poly (episulphide) having terminal reactive groups, preferably of less than 10,000 molecular weight, and a potentially thermosetting aminoplast, which are then reacted to give a cross-linked product.

---

This invention relates to sheet material and particularly to flexible sheet material comprising one or more fibrous webs impregnated with a composition derived from a polymer of one or more episulphides, and to a method for the manufacture of such sheet material.

According to the present invention, a sheet material comprises a fibrous web impregnated with a composition comprising the reaction product of a polymer of one or more episulphides having at least two reactive terminal groups, and a potentially thermosetting aminoplast.

According to the present invention also, a method for the manufacture of a sheet material comprises impregnating a fibrous web with an impregnating composition comprising a blend of a polymer of one or more episulphides having at least two reactive terminal groups and a potentially thermosetting aminoplast, and effecting reaction of the polymer with the aminoplast to produce a solid cross-linked product.

The impregnating composition is obtained by blending a polymer of one or more episulphides having at least two reactive terminal groups with a potentially thermosetting aminoplast, and the reaction between the two to produce a solid cross-linked product can be carried out in the presence of a catalyst to accelerate the reaction. Examples of suitable catalysts are acid dibutyl phosphates and paratoluene sulphonic acid. The catalyst is usually used in the form of an acidic solution. The amount of the catalyst is not critical but will usually be from 0.1 part to 3 parts by weight per 100 parts by weight of the aminoplast.

The polymer of one or more episulphides has at least two reactive terminal groups which can be, for example, thiol groups, hydroxyl groups, amino groups or epoxy groups. A method for the manufacture of suitable polymers is described in our co-pending U.S. Patent application Ser. No. 463,016, now Patent 3,325,456, in which there is described a process for the preparation of a polyepisulphide which comprises polymerizing one or more episulphides in the presence of a polymerization catalyst being a compound of a metal of the B sub-group of Group II of the Mendeleeff Periodic Table and a cocatalyst being ammonia, an inorganic ammonium compound, an organic amine, hydrazine or a derivative of hydrazine. The resulting polymer has a terminal thiol group and another reactive terminal group which will usually be an amino group.

The polymer of one or more episulphides can have a molecular weight of greater than 10,000 but it is preferred to use a polymer having a molecular weight of less than 10,000, and particularly useful polymers are those having a molecular weight of less than 3,500. Typical polyepisulphides are poly(ethylene sulphide), poly(propylene episulphide) and poly(butylene episulphide). The polymer will usually be a liquid, of low viscosity, but polymers of high viscosity or even solid polymers can be used in the form of a solution in an organic solvent therefor. Suitable organic solvents are hydrocarbons such as benzene and toluene, chlorinated hydrocarbons such as chlorobenzene and chloroform, and carbon tetrachloride. The amount of the solvent is not critical and amounts of up to 300 parts by weight per 100 parts of the polymer can be used. It may, in certain cases, be advantageous to blend the polymer and the aminoplast in the presence of a solvent to produce an impregnating composition which has a low viscosity and which can be dipped, painted, spread, or sprayed on to the fibrous web to be impregnated. The viscosity of such an impregnating composition can readily be adjusted by adding solvent to or removing solvent from the composition, as desired.

The aminoplast can be any of the known potentially thermosetting aminoplasts, and examples of suitable aminoplasts are the condensation products of amino compounds with formaldehyde and, if desired, copolymers of the aminoplast with epoxides. Typical amino compounds which can be used to form the resins are urea, ethylene urea, and amino-triazines such as melamine and benzoguanamine. The aminoplasts which may be used are potentially thermosetting, i.e. they can be cross-linked and caused to set by heating them, and are usually used in solution. The amount of the aminoplast used is not critical, but will usually be from 1.0 part to 5.0 parts by weight per 1.0 part of the polymer of one or more episulphides.

The blending of the polymer of one or more episulphides and the potentially thermosetting aminoplast is usually carried out at room temperature, and it is preferred to apply the resulting impregnating composition to the fibrous web at room temperature and after evaporation of the solvent the composition is heated to an elevated temperature, for instance from 140° C. to 200° C. to complete the reaction of the two components of the composition (i.e. curing) to give a solid cross-linked composition.

A fibrous web is impregnated with the composition by any suitable means, for instance by spraying, brushing or spreading, and especially by dipping to obtain a fibrous web:impregnating composition weight ratio of 1.0:0.5 to 1.0:3.0, preferably 1.0:1.0 to 1.0:2.0. The fibrous web can be a single layer such as a paper web or a web of textile fibres which may be in the form of a woven fabric or a felt, or it may be a multilayer composite web. A composite structure can be formed, for example, from paper webs and textile fibre webs, and if desired a layer of a non-fibrous material may be incorporated. For instance, a strip of aluminium or other heat-resistant material may be included to confer heat-resistant properties on the impregnated fibrous material. Where the fibrous web is formed of several layers, these layers may be united together before the impregnating composition is applied, or they may be non-united layers which are united by the impregnating composition itself when the composition is cross-linked and in such cases the resulting composite fabric is flexible. Alternatively, more than one separate web can be impregnated with different resins and the impregnated webs can be superimposed prior to, or subsequent to effecting curing of the composition. Where the fibrous web comprises two or more layers which are united prior to impregnating with the impregnating resin, then the layers forming the web may be mechanically locked together, for instance by needling, or they can be impregnated and laminated together by means of conventional laminating resins, for example aminoplastics or phenolic resins. In the latter case, the top web is impregnated with the impregnating composition which forms a working surface for the composite. Such laminates, whilst not usually flexible, are more resistant than conventional decorative laminates to alkali and to chipping.

The impregnated fibrous web is dried at room temperature or by heating to an elevated temperature, of say, 70° C. to 80° C. in an air oven, and the two components of the impregnating composition are reacted and the composition thereby cured, and curing can conveniently be effected by heating the impregnated web to an elevated temperature, for example from 140° C. to 200° C. The time for which the impregnated web is heated is to some extent determined by the cure temperature, and the lower the cure temperature the longer will be the time required to effect curing of the composition. As hereinbefore stated, curing can be carried out at a temperature of about 180° C., and at such a temperature the time required will usually be about 5 to 30 minutes.

The impregnated fibrous web is compressed before the impregnating composition is fully cured. Usually, the web is compressed during curing of the composition by heating, and the impregnated web may be compressed throughout the heating or for only a part of the heating. The impregnated fibrous web can be compressed at this elevated temperature between heated press platens which may be provided with a covering of a release agent or release paper to enable the fully or partially cured impregnated web to be stripped from the press. If desired, the impregnated web may be compressed during the initial heating period, and the heating may be continued after compression has ceased. In this latter case it may be necessary to heat the impregnated web after the compression has ceased for a period of several hours and usually at a temperature less than the temperature at which the web is heated under compression, and suitable temperatures are from 100° C. to 150° C.

The sheet materials of the present invention have a hard glossy surface of cured impregnating composition, and the surface is resistant to staining by common household liquids and cleaners, and because of this property the sheet materials of the invention are particularly suitable for use as covering materials for kitchen shelves, walls and tables. If desired, a decorative fibrous web, e.g. a decorative paper web may be used to give the material an attractive appearance. In the latter case, a thin white overlay paper is often used to form the working surface of the laminate. This overlay paper becomes transparent when coated with the impregnating composition and, thus, the decorative appearance is maintained. The sheet material may be provided with a backing of adhesive, which may be covered with a release paper to yield a sheet material from which the release paper may be removed to give an adhesive surface to enable the material to be readily attached to the surface to be covered.

EXAMPLE I 1.0 part of poly(propylene episulphide) of molecular weight 1040 and having one terminal thiol group and one terminal amino group was mixed with 3.0 parts dry weight of a butylated benzoguanamine/formaldehyde resin available under the trade name BE. 659, as a 70 percent solution in n-butanol and 0.075 part of a catalyst being a 20 percent solution of acid butyl phosphate in a mixture of xylene and butan-1-ol.

Both surfaces of a decorative paper web were coated with the impregnating composition by spreading to give a paper/resin weight ratio of 1:1. Also, both surfaces of a white overlay paper web were coated with the impregnating composition by spreading to give a paper/resin weight ratio of 1:2 and then the two coated paper webs were air-dried and superimposed. The webs were pressed together for 10 minutes at 180° C. between chromium plates which had previously been coated with a silicone release agent.

The resulting laminate had the following physical properties:

| Test: | Result |
| --- | --- |
| Water absorption [1] | 9 percent weight increase. |
| Heat—20 minutes at 180° | Good resistance. |
| Sheen scratch test | 2900 gms. |
| Flexibility [2] | Pass. |

[1] The water absorption was measured by immersing the laminate in boiling water for 2 hours.
[2] Flexibility was determined by bending the laminate around a ¼ inch steel mandrel. To pass the test, the laminate must show no sign of flaking or cracking.

The laminate was also subjected to a staining test in which its surface was in contact with the following liquids for 24 hours at room temperature:

Milk
Tea
Coffee
Iodine
10 percent acetic acid
10 percent sodium hydroxide solution
Methylated spirits The laminate showed no staining in each test.

EXAMPLE II 1.0 part of poly(propylene episulphide) of molecular weight 1040 as used in Example I, was mixed with 3.0 parts dry weight of an epoxy/melamine copolymer resin available under the trade name BE. 649 as a 60 percent solution in 1:2 xylol:n-butanol, and 0.0015 part of the catalyst described in Example I to form an impregnating composition.

Both surfaces of decorative and overlay papers were impregnated as in Example I. The two impregnated papers were dried, superimposed and pressed together for 30 seconds at 180° C. between chromium plates which had previously been coated with a silicone release agent. The laminate was removed hot and the cure completed by heating at 100° C. for 18 hours in an air oven.

The resulting laminate had the following physical properties.

| Test: | Result |
| --- | --- |
| Heat—20 minutes at 180° C. | Excellent resistance. |
| Sheen scratch test | 2000 gms. |
| Flexibility | Pass. |

Having now described our invention, what we claim is:

1. Sheet material comprising a fibrous web impregnated with a composition which comprises a reaction product of a polymer of at least one episulphide having at least two reactive terminal groups and a potentially thermosetting aminoplast, the amount of said aminoplast being sufficient to effect cross-linking of the polymer composition.

2. Sheet material according to claim 1 wherein said polymer has one or more terminal groups selected from the class consisting of thiol groups, hydroxy groups, amino groups and epoxy groups.

3. Sheet material according to claim 1 wherein said polymer of at least one episulphide has a molecular weight less than 10,000

4. Sheet material according to claim 1 wherein said polymer of at least one episulphide has a molecular weight less than 3,500.

5. Sheet material according to claim 1 wherein the weight ratio of the fibrous web:impregnating composition is from 1.0:0.5 to 1.0:3.5.

6. Sheet material according to claim 1 wherein said fibrous web is a paper web.

7. Sheet material according to claim 1 wherein said fibrous web comprises a woven or non-woven textile material.

8. Sheet material according to claim 1 wherein said fibrous web comprises at least one paper web bonded to a web of a woven or non-woven textile material.

9. A method for the manufacture of a sheet material which comprises impregnating a fibrous web with an impregnating composition comprising a blend of a polymer of at least one episulphide having at least two reactive terminal groups and a potentially thermosetting aminoplast, the amount of said aminoplast being sufficient to effect cross-linking of the polymer composition, and heating of said web to effect reaction of the polymer with the aminoplast to produce solid cross-linked products.

10. A method according to claim 9 wherein a catalyst to accelerate the reaction of the polymer is present in the impregnating composition.

11. A method according to claim 10 wherein said catalyst is acid butyl phosphate.

12. A method according to claim 10 wherein said catalyst is paratoluene sulphonic acid.

13. A method according to claim 10 wherein said catalyst is present in an amount of from 0.1 to 3 parts by weight per 100 parts of the aminoplast.

14. A method according to claim 9 wherein said polymer of at least one episulphide has at least one terminal group selected from the class consisting of thiol groups, hydroxy groups, amino groups and epoxy groups.

15. A method according to claim 9 wherein said polymer of at least one episulphide has a molecular weight less than 10,000.

16. A method according to claim 9 wherein said polymer of at least one episulphide has a molecular weight less than 3,500.

17. A method according to claim 9 wherein the amount of the aminoplast present is from one part to 5 parts per one part by weight of polymer of at least one episulphide.

18. A method according to claim 9 wherein said polymer of at least one episulphide and said aminoplast are blended together at room temperature and said fibrous web is impregnated with the impregnating composition so obtained at room temperature.

19. A method according to claim 9 wherein said fibrous web is impregnated with the impregnating composition in a weight ratio of from 1.0:0.5 to 1.0:3.0.

20. A method according to claim 19 wherein said weight ratio is from 1.0:1.0 to 1.0:2.0.

21. A method according to claim 9 wherein the impregnated web is heated to a temperature of from 140° C. to 200° C. to complete the reaction of said polymer and said aminoplast and thereby effect curing of the impregnating composition.

22. A method according to claim 9 wherein the impregnated web is maintained under compression during at least part of the heating stage to effect reaction of the polymer and the aminoplast.

23. A method according to claim 22 wherein said impregnated web is heated at a temperature of from 140° C. to 200° C. whilst being maintained under compression for a period of time insufficient to complete the cure of the impregnating composition, and subsequently further heated at a temperature less than that to which it was heated while compressed to complete the cure.

References Cited

UNITED STATES PATENTS

| | | | |
|---|---|---|---|
| 3,087,912 | 4/1963 | Wagner et al. | 260—849 X |
| 3,177,090 | 4/1965 | Bayes et al. | 260—849 X |
| 3,325,456 | 6/1967 | Adamek et al. | 260—79.7 |

WILLIAM D. MARTIN, Primary Examiner

D. COHEN, Assistant Examiner

U.S. Cl. X.R.

117—140, 155, 161; 161—187; 260—79.7, 849